3,836,648
**TREATMENT OF CANINE DISTEMPER WITH A MICROBIAL PRODUCT DERIVED FROM THE BACTERIUM *ACHROMOBACTER STENOHALIS***
Joseph K. Chang, 3–21, 6-chome Seijomachi, Setagaya-ku, Tokyo, Japan
No Drawing. Filed Aug. 16, 1971, Ser. No. 172,289
Int. Cl. A61k 27/00
U.S. Cl. 424—195                                   7 Claims

ABSTRACT OF THE DISCLOSURE

Canine distemper is treated by administering to the animal a therapeutic agent containing the filtrate of an admixture of water and inactivated bacteria belong to *Achromobacter stenohalis*.

BACKGROUND OF THE INVENTION

Dogs are vaccinated against distemper generally within twelve weeks after birth. Even after vaccination, however, some dogs produce only a very small quantity of the required neutralized antibodies and others do not produce any neutralized antibodies. This is a result of the differences in susceptibility of the animal to the vaccine. If the value of neutralized antibodies produced is less than 50, the vaccination has no preventative power against infection.

Outbreaks of canine distemper occur each year in large or small scale. However, the viral strain causing the disorder is not the same each year and if the preventative vaccine does not correspond to the prevailing strain, the effect of the vaccine is diminished. Therefore, even if preventative vaccination has occured, the dog may be effected by distemper. When a dog has not had preventative vaccination, it is, of course, affected.

One of the conventional therapies for distemper is serum therapy. The amount of serum used is determined by the body weight of the dog, generally 1–2 ml./kg. If the titer of the serum is to be effective, 0.1 ml. of serum should contain 6000 Cornell units. Thus, the amount of serum given to a 2–3 kg. dog should be 5 ml. containing 300,000 Cornell units. However, the titer of serum which has been preserved for a long time declines sharply. For example, it has been found that commercially available serum contains only 108–427 Cornell units per 0.1 ml. Therefore, in order to have 300,000 Cornell units, it is necessary to employ 70–277 ml. of serum. The serum is a very expensive substance and the cost of 277 ml. for use on a dog weighing 2–3 kg. is prohibitive. Moreover, in serotherapy, serum must be used at an early stage of the disease in order to have therapeutic effect.

It has been determined that the use of antibiotics has litle effect in treating distemper although they have some use in treating the secondary infections.

Accordingly, it is the object of this invention to provide a therapeutic agent for the treatment of canine distemper. This and other objects will become apparent to those skilled in the art from the following detailed description.

SUMMARY OF THE INVENTION

This invention relates to the treatment of canine distemper, and, more particularly, relates to the treatment of this disease with a therapeutic agent containing the filtrate of an admixture of water and inactivated bacteria of *Achromobacter stenohalis*.

DESCRIPTION OF THE PREFERRED EMBODIMENTS

The therapeutic agent of the present invention is prepared by a process which includes the steps of inoculating a seed of the bacterium into a culture medium of *Achromobacter stenohalis* in which there is dissolved about 0.1% to about 10% by weight of an inorganic salt, incubating the inoculated medium for a period sufficient to grow the bacterium, inactivating the bacterium, and admixing the bacterium with water.

The bacterium *Achromobacter stenohalis*, from which the microbiol product of this invention is derived has been isolated from sea water, marine mud and marine phytoplankton. A strain of *Achromobacter stenohalis* has been deposited at the American Type Culture Collection as Deposit No. 21710. Further details with respect to the identity of the bacterium can be found in my Japanese Pat. No. 578,762.

The bacteria is cultivated in an inorganic salt containing agar medium or semi-synthetic medium which can optionally contain a nutrient such as glucose and pepton. The salt concentration in the agar medium is critical and must be within the range of about 0.1–10 weight percent. Preferably, the concentration of the salt, such as sodium chloride or magnesium chloride, is about 0.5% to 8% and most preferably about 3–5 weight percent.

A nutrient or a mixture of nutrients is advantageously employed in the preparation of an agar cultivation of *Achromobacter stenohalis*. Conventional nutrients which usually contain protein may be used. For example, the medium can contain 5% of dextrose as a source of carbon and 0.5–1% peptone as a source of nitrogen.

A preferred temperature for the cultivation is about 20–37° C. and preferably about 25–28° C. Within the preferred temperature range, the incubation period is 24–48 hours.

The resulting nutrient agar preferably has a pH of about 6.5 to 7.2. The agar is used in the usual manner to prepare an agar slant which is then inoculated with a suitable amount of a seed of actively growing culture for the cultivation of *Achromobacter stenohalis*. For a 500 ml. culture medium, 3 ml. of seed is generally adequate. During the incubation period, the culture should be ventilated and shaken.

After incubation, the bacterial bodies are collected and then inactivated. This can be accomplished by mixing the bacterial bodies with distilled water in an equal amount or double the amount of the bodies, and heating the mixture to about 56°–70° C., for about 30–45 minutes, preferably about 30 minutes. If desired, other methods of inactivation can be employed, such as exposure to ultraviolet radiation or the addition of an aldehyde such as formalin. Also, if desired, the bacterial bodies can be frozen and melted as described in my aforementioned Japanese patent.

Although the inactivated bacteria-water admixture can be used without further treatment, it is preferred to remove the thick mucous substance covering the bacterial bodies. This is accomplished in a high speed centrifuge (15,000 to 20,000 r.p.m.), normally for a period of 15–60 minutes. The bacterial bodies are thereafter differentiated in the same apparatus. It is desirable that the centrifugal operation be repeated several times. The bacterial bodies after separation from their mucous coating are triturated mechanically, for example, by the new plane method. In the new plane method, masses of the bacterial bodies are placed between two sheets of glass and the sheets are rubbed against each other to finely divide the bacterial bodies. Distilled water, in an amount up to about 15 times the triturate, is added and the aqueous triturate is sterilized, e.g. by heating for 30 minutes at 60°–70° C. and asceptically filtered. The filtrate constitutes the therapeutic agent of this invention.

The toxicity of the therapeutic agent has been determined in mice and dogs. In mice, the $LD_{50}$ of intraperitoneal administration is 219 ml./kg. In dogs, toxicity was tested by injecting gluteally 5 ml. of the therapeutic agent on the third, fourth and fifth day of the test, and the animals were kept under observation for 12 days. They showed evidence of considerable pain for two or three minutes after injection, but no induration on the site of injection nor any other side effects. Thus, no toxicity reaction to this administration of 5 times the normal therapeutic dosage was observed.

The following Examples are set forth to further illustrate the invention, but are not intended to limit it. Unless otherwise specified throughout this specification and claims, all parts and percentages are by weight and all temperatures are in degrees centigrade.

EXAMPLE 1

Preperation of the Therapeutic Agent

*Achromobacter stenohalis* (ATCC 21710) was incubated on an agar culture medium which contains 0.5% dextrose, 0.5% peptone and 3% magnesium chloride. After incubation for 48 hours at 28° C., 500 mg. of the bacterial bodies were collected. One liter of distilled water was mixed well with the bacterial bodies with stirring and the resulting mixture was frozen at −20° C. Thereafter, the frozen mixture was allowed to melt at room temperature followed by heating to 65° C. for 30 minutes.

EXAMPLE 2

Treatment of Canine Distemper

In this Example, 5 month old uterine dogs weighing 7 kg. each were employed. The animals were examined to make sure they had no abnormalities on palpitation, that the test for neutralizing antibodies in the blood was negative, and that the leucocytes counts showed no abnormal reduction. The distemper virus strains employed were successively inoculated Snyder-Hill canine virus strains which had been diluted to $10^{-1}$.

Each dog was artificially infected by inoculation intraperitoneally with 3 ml. of the virus. Then, the dogs were divided into two groups. 5 days after inoculation with the distemper strains, the therapeutic group received an intramuscular injection of 1 ml. of the therapeutic agent of Example 1. Administration of the therapeutic agent was continued for days.

The dogs in the treated group all produced sufficient neutralizing antibodies within 7–10 days to allow the animals to recover completely. However, the dogs in the control group perished before the natural production of antibodies was sufficient to combat the disease.

EXAMPLE 3

In vitro tissue culture tests were conducted on the therapeutic agent of this invention. When the therapeutic agent of Example 1 was tested, the tissue culture test showed a marked manifestation of CPE phenomenon (a phenomenon in which cells are pathologically destroyed).

An additional test was made with the therapeutic agent of Example 1 which had further been subjected to high speed centrifugation to remove the mucous substance surrounding the bacterial bodies. The bodies were then triturated, washed with water and the filtrate recovered. In this test, the cells did not manifest any CPE phenomenon.

While the in vitro testing indicated that the removal of the mucous substances from the bacterial bodies was necessary, the result of Example 2 clearly demonstrates that the drug with the mucous membrane on the bacterial bodies had therapeutic effect. It is therefore concluded that the mucous substance on the bacterial bodies is also capable of promoting the production of the necessary antibodies to canine distemper. The in vitro testing also demonstrates that use of the purified therapeutic agent, i.e., the filtrate of the water-inactivated bacteria admixture is preferable.

EXAMPLE 4

Treatment of Canine Distemper

Seven dogs, 83 days of age, were artificially infected with canine distemper in the same manner as in Example 2. All of the dogs developed a first peak of fever which continued for about 24 hours whereupon they became aferbrile and stayed normal for 4 days. 5 of the dogs were given injections of the therapeutic agent of Example 1 every day starting on the day when the first peak of fever developed.

Four days after the first peak of fever subsided, a second peak was observed. The dogs in the therapeutic group responded quickly. One of the two control dogs died on the 16th day of the test; one of the 5 treated dogs died on the 20th day. Since the control dog which survived was found to have had a high level of antibodies (72.8) before inoculation of the virus, it was not surprising that this dog survived.

In the therapeutic group, the time needed for disappearance of manifestations of distemper and for normal conditions to be restored was 14–15 days while the control survivor required 24 days for restoration of normalcy.

EXAMPLE 5

Treatment of Canine Distemper

Seven dogs. 90 days of age, were infected with distemper as in Example 2. At the first onset of temperature, the dogs in the therapeutic group were given injections of 1 ml. of the therapeutic agent of Example 1 which was continued daily for days. The results are shown in the following Table.

| Dog No. | Sex | Weight | Result | Antibody values | | |
|---|---|---|---|---|---|---|
| | | | | Start | 13 days | 20 days |
| Treated group | | | | | | |
| 1 | M | 6,550 | Alive | 0 | 33.2 | 730.2 |
| 4 | M | 6,300 | do | 0 | 29.2 | 559.0 |
| 5 | F | 6,000 | do | 0 | 34.4 | 732.8 |
| 6 | M | 7,200 | Died on 14th day | 0 | 5.8 | |
| Control group | | | | | | |
| 2 | F | 6,900 | Died on 14th day | ( | 10 | |
| 3 | F | 6,800 | do | ( | 14.5 | |
| 7 | F | 7,000 | Died on 20th day | 0 | 10 | 145.9 |

In the therapeutic group, the animals which survived remained fairly vigorous throughout the experimental period and the symptoms manifested gradually improved after injection of the therapeutic agent and totally disappeared after 10–15 days. In the control group, the conditions constantly deteriorated and no improvement was noticed.

EXAMPLE 6

Treatment of Canine Distemper 195 dogs, ranging in age from 2 months to 5 years, which had distemper syndrome disease were collected in Takatsuki, Japan and the surrounding areas of Osaka. The sick dogs, as a rule, had not had virulent alive vaccine inoculations. The dogs included 118 mongrels, 44 Spitz, 9 Akita, 7 Mikawa, 4 Cockers, 3 Terriers, 2 Shepherds, 2 English Pointers, 1 Setter, 1 Doberman, 1 Maltese, 1 Beagle, 1 Kishu, and 1 Collie.

To each of the dogs, 1 ml. of the therapeutic agent of Example 1 was administered once a day subcutaneously or intravenously. Injections of penicillin, streptomycin, Terramycin or chloramphenicol were also administered only if necessary. As a result of the treatment, 167 (86%) of the dogs recovered clinically and 28 died.

All of the dogs treated were classifiable into two groups. One group (126) had the therapeutic agent administered 2–17 times within 6 days of development of the disease. All members of this group recovered. The other group (69 dogs) received administration of the therapeutic agent 7 or more days after development of the disease. In this latter group, 41 (59%) recovered and 28 (41%) died.

Various changes and modifications can be made in the process of this invention without departing from the spirit and the scope thereof. The various embodiments disclosed herein serve to further illustrate the invention but are not intended to limit it.

I claim:

1. A method of treating canine distemper which comprises administering to the animal an effective curative amount of a therapeutic agent comprising the filtrate of an admixture of water and inactivated bodies of a bacteria belonging to *Achromobacter stenohalis*.

2. The method of claim 1 wherein the bacteria bodies have been inactivated by heat.

3. The method of claim 1 wherein the inactivated bodies in the admixture have been triturated.

4. The method of claim 1 wherein the therapeutic agent is administered intramuscularly.

5. The method of claim 1 wherein the therapeutic agent is administered intravenously.

6. The method of claim 1 wherein the dosage of the therapeutic agent administered is 1 ml. per day.

7. The method of claim 1 wherein the bacteria bodies have been inactivated by heat and wherein the inactivated bodies in the admixture have been triturated.

References Cited

Chem. Abst. Subject Index—7th Collective, vol. 56–65 (1962–1966). p. 449s.

SAM ROSEN, Primary Examiner

U.S. Cl. X.R.

424—92